March 23, 1943.  E. W. PATTERSON  2,314,595
GEAR UNIT
Filed Sept. 3, 1940
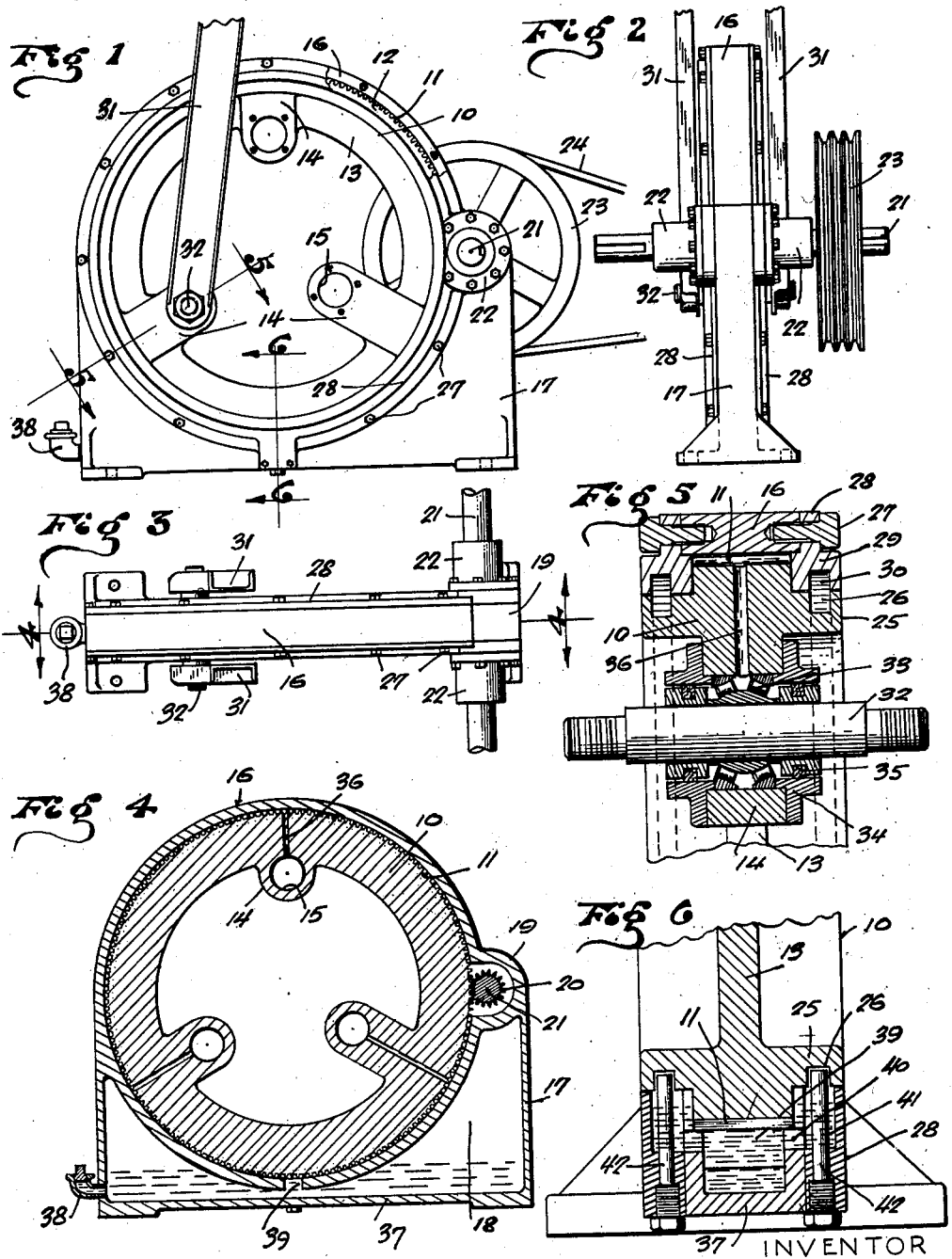
INVENTOR
EDGAR W. PATTERSON
BY
ATTORNEYS Patented Mar. 23, 1943

2,314,595

UNITED STATES PATENT OFFICE 2,314,595

GEAR UNIT

Edgar W. Patterson, Long Beach, Calif.

Application September 3, 1940, Serial No. 355,159

7 Claims. (Cl. 74—414)

The present invention relates generally to gear units of the type now employed as speed reducers between prime movers such as electric motors or internal combustion engines and work of the character of well pumping, where means, as for instance, cranks and pitmans, are employed in connection with the gear units to convert the reduced speed rotation to slow reciprocation.

Gear units as employed in connection with well pumping apparatus including pitman-actuated walking beams, are commonly completely encased gear sets in which the low speed member is a gear, usually a herringbone gear, on the central portion of a low speed shaft whose ends project laterally substantially beyond the sides of the gear casing for receiving the fixed ends of pitman actuating cranks.

The gear case and the side bearings for the low speed shaft of such units make up considerable width, and it is well known that such arrangements or apparatus are costly since, in addition to their expensive gears, heavy low speed shaft and two heavy low speed shaft bearings, they necessitate the employment of two cranks, one at each end of the low speed shaft, with bearing connections for the lower ends of the two pitmans.

Recognizing the above facts, all well known in the oil well pumping art, it is the primary object of the present invention to provide a gear unit or apparatus in which, without sacrificing strength, durability, or general effectiveness, much of the above mentioned expensive equipment may be dispensed with, much of the present expensive machining of parts may be avoided, production costs may be greatly reduced, and speed of production greatly increased.

Further and more specifically, the invention aims to provide a gear unit in which the usual low speed shaft, its bearings, and the pitman cranks are eliminated and a low speed member substituted therefor which is of a nature adaptable to connection directly to the lower ends of the pitmans extending to the walking beam, and to greatly reduce the usual spacing of the pitmans so that the latter may be connected at their upper ends to the beam by means of a connection of greatly reduced cost as compared to the present costly equalizing bar connection.

The low speed shaft and crank pins of the usual gear units need separate bearings at four points, two in the sides of the gear case, and two at the lower or inner ends of the pitmans, requiring separate lubrication. The present invention has for a further object the elimination of such series of separately lubricated bearings and the provision of an arrangement whereby a single bearing takes care of the connection between the low speed gear and the two pitmans and whereby such bearing and the low speed member of the gear unit will be thoroughly and efficiently oiled at all times without requiring the filling of oil cups, or otherwise depending upon the constant care of an operator.

The manner proposed by the invention for the fulfillment of the foregoing objects, and other and further objects of the invention, which with its resulting advantages will be more particularly pointed out hereinafter, may be readily understood and appreciated from the following description in detail of the best mode so far devised for carrying the invention into practical use, and by reference to the accompanying drawing, forming a part of this specification, and in which, Figure 1 is a side view of the complete gear unit, with pitmans attached, a portion of the near casing ring being broken away.

Figure 2 is an end view thereof looking at Figure 1 from the right of the latter figure.

Figure 3 is a top plan view, the driving connections of the high speed shaft being eliminated.

Figure 4 is a vertical longitudinal sectional view through the unit, taken substantially on line 4—4 of Figure 3.

Figure 5 is an enlarged partial vertical transverse sectional view taken substantially on line 5—5 of Figure 1, and, Figure 6 is a similar view taken substantially on line 6—6 of Figure 1.

Referring now to these figures, the low speed member of my improved gear unit is in the form of an enlarged ring gear 10 with transversely disposed teeth 11 continuously around its rim 12 and entirely open and hubless with the exception of an annular strengthening rib 13 around the inner circumference of the rim 12 along its median line, and radially inwardly extending bearing supports or crank arms 14.

All of the above described parts are of integral formation, constituting a shaftless low speed gear, and the several equi-distantly spaced crank arms 14, within the rim 12 of the gear, have crank pin openings 15 which are graduated in their spacing with respect to the axis of the gear ring and are open to selection as the support of a pitman actuating crank pin for varying the stroke length of the pitmans actuated thereby.

For the rotative support of the low speed gear, as thus far described, the invention proposes a frame or case whose upper portion is in the form of an annulus 16 in which the low speed ring gear 10 has a rotative fit, the peripheral faces of the teeth 11 of the gear being in rotative bearing with the inner surface of the casing annulus 16.

The lower portion of the frame or case is in the form of a hollow base 17 encompassing approximately the lower half of the annulus 16 and constituting an oil chamber 18 therein, as hereinafter more particularly referred to, below an enlargement 19 of one side of the annular for housing the high speed gear 20 which meshes with the ring gear teeth 11 and is on a shaft 21. This high speed shaft 21 has bearings 22 at opposite sides of the enlargement 19 which are open to the space within the latter around the high speed gear, and extends exteriorly for the support of a pulley 23 or other belt or otherwise driven means extending from a suitable source of power. A belt 24 is indicated in Figure 1, but it is to be understood that the high speed shaft 21 may be driven from any suitable source of power and through any suitable connections.

For the above purposes the annulus 16 is, of course, machined to a truly cylindrical inner surface to receive the gear ring 10 in the relation above described, and it will be noted from Figure 5 in particular that it is of somewhat greater width than that of the toothed rim 12 of gear 10 so as to overhang the opposite sides of the rim in radially spaced relation to, and outwardly beyond, laterally projecting annular ribs 25 of the low speed ring gear 10 whose outer peripheral surfaces have therein annular oil grooves 26.

To the opposite sides of the annulus 16 are securely fastened, as by means of bolts 27, a pair of annular casing rings 28, the inner annular portions of which are enlarged to extend into the sides of the annulus 16 and rotatively contact the side faces of the rim 12 of the ring gear 10. These enlarged portions 29 of the casing rings 28 have their inner peripheral surfaces in rotatively bearing contact with the outer peripheral surfaces of the ribs 25 of the gear 10, and are provided with annula roll grooves 30 opposite to, and in communication with, the oil grooves 26 of the gear ribs 25.

The casing rings 28 thus laterally confine the low speed gear 10 within the casing annulus 16 and their enlarged inner portions 29 rigidly shoulder against the inner surface of the annulus and cooperate with the gear ribs 25 in the rotative support of the said gear in a manner which admits of constant thorough lubrication as presently described.

By reference to Figure 5 it will be noted that for the connection of the lower ends of the two pitmans 31, seen in Figures 1 to 3, a single crank pin 32 is extended through one of the crank pin openings 15, and a single point of bearing support within an anti-friction, combination radial and thrust bearing 33 maintained within an opening 15 by bolted side caps 34, within which the pin 32 has oil rings 35. The bearing 33 is shown in Figure 5 as a conventional aligning bearing, and the opposite ends of the crank pin 32, to which the lower ends of the pitmans 31 are securely clamped, are thus afforded a definite equalizing movement which is of considerable importance in many practical uses to which the invention may be adapted. For thoroughly oiling the bearing 33, each crank pin support 14, as plainly seen in Figures 4 and 5, has an oil channel 36 lengthwise thereof from the toothed outer surface of the rim 12 of gear 10 to the crank pin opening 15 thereof, to thus feed oil to each of the said openings, it being understood that the two unused openings are covered by side plates (not shown).

As plainly seen in Figure 4, the oil chamber 18 of the base 17 of the case is filled with oil to a level substantially above its flat bottom 37, oil being supplied therein through a filling nipple 38, normally stoppered, and placed to gauge the depth of the oil in the chamber. For this purpose the oil receiving mouth of the exterior end of nipple terminates at the desired level below the upper inner edges of the casing rings 28 and thus below the joint between these rings and the gear ribs 25.

As also plainly seen in Figure 4, the lower central portion of the annulus 16 has an oil aperture 39 which opens into the oil chamber 18 of the case below the level of oil therein and is in communication, through side ports 40, as seen in Figure 6, with cut away lower portions 41 of the ring grooves 30. Thus the low speed gear 10 dips into the oil in the lower portion of the oil chamber 18 and its teeth gather oil which is carried up and around with the gear to thoroughly lubricate the same in its bearing contact with the annulus and with the side rings 28, as well as provide constant lubrication for the crank pin bearing in the manner previously set forth.

The film of oil passing between the gear 10 and the side rings 28 is collected in the oil collecting grooves 26 and 30 and, in order to prevent these grooves from filling up, scraping pins 42 are fixed to upstand through the lowermost portions of the side rings 28, as in Figure 6, with their upper free ends extending into the rib grooves 26. Thus oil is continuously scraped out of the collecting grooves at the lower portion of the gear where its teeth dip into the oil supply.

Thus, referring back to the objects of the invention as first above stated, it is obvious that by the provision of a low speed shaftless gear as disclosed, the high torque of the usual low speed shaft is eliminated which in turn eliminates the necessity for such expensive items as a heavy low speed shaft, two heavy low speed shaft bearings, a pair of expensive cranks, crank bearings and one crank pin. Such a construction furthermore eliminates approximately one half of the metal and machine work involved in the usual gear case.

By reason of the provision of a low speed gear whose bearing is at or near its toothed periphery, at a greater distance or radius from its center than the crank pin, the crank pin is always within the bearing of the gear and not only is there a very low pressure per square inch on the large bearing surface as compared to the usual crank shaft bearing, but the connecting pitmans, fixed to a single crank pin, may be placed very close together, thus simplifying their connection to the gear unit and making it possible to employ a much more simple and less expensive equalizing connection between their upper ends and a walking beam as compared to that required for the widely separated pitmans extending from the shaft end cranks of the usual gear unit.

The side rings 28 not only prevent lateral displacement of the present low speed gear, but also provide for the rotative bearing of the gear as well, though it is to be understood the bearing engagement of the toothed periphery of the gear against the inner surface of the annulus may be depended upon either with or without the cooperation of the rotative support of the gear by the side rings and vice versa.

As before stated the crank pin, at whatever radius it is disposed in the selected crank pin support, is always within the radius of the gear bearing, and it is obvious from the foregoing that such arrangement not only lends itself to thorough, efficient and constant lubrication as to the bearing of the gear itself but also as to the crank pin bearing.

It is believed to be plain from a consideration of the foregoing that the type of reduction gearing disclosed herein may be designed for either single, double or triple reduction, and that the shaftless low speed gear and its driving pinion may be in the form of a toothed pair of gear members for chain driven operation, and furthermore, that the low speed gear may be mounted upon either a ball or roller bearing assembly around its supporting ribs 25 without departing in any respect from the spirit of the invention.

Having thus fully described the present invention, what is claimed is:

1. In pump gearing, a speed reducing gear unit including a low speed member in the form of a shaftless ring gear having an externally toothed surface, and a support having an oil chamber and including a supporting annulus around said gear open to receive oil from said chamber and presenting a bearing surface circumferentially around and closely adjacent to the toothed surface of the gear whereby to adapt the gear to carry oil therearound and means secured to the sides of the annulus in bearing engagement with the gear and forming with the annulus a complete housing for the toothed portion of the gear.

2. In a speed reducing gear, a low speed shaftless gear ring, a support having an annulus circumferentially around the gear, said gear having a rim portion with a toothed surface facing the annulus, and also having ribs at opposite sides of, and inwardly beyond, said toothed rim portion, and bearing rings secured to the sides of the annulus entirely therearound in bearing contact with the outer surfaces of said ribs and also with the side surfaces of the rim portion of the gear.

3. In a gearing of the character set forth, a low speed member in the form of a shaftless ring gear having an externally toothed rim, a support including an annulus around the toothed rim of the gear and a hollow base portion forming an oil reservoir into which the lower portion of the gear dips, the said annulus being open at its lower portion into the oil reservoir and forming with the toothed surface of the gear an oil channel in which a supply of oil is constantly carried up around the gear, a crank pin support extending inwardly of the gear from its rim and having an oil feed channel therethrough from the toothed surface of the rim, and a single crank pin having a bearing in said support and fed with oil through said channel, with its opposite ends extending laterally beyond the sides of the gear.

4. In a gearing of the character set forth, a low speed member in the form of a shaftless ring gear having an externally toothed rim, a support including an annulus around the toothed rim of the gear and a hollow base portion forming an oil reservoir into which the lower portion of the gear dips, a pair of side rings secured to the annulus and confining the gear rim against lateral displacement, said rings and said gear having relatively engaging surfaces forming an annular bearing for the gearing adjacent to its rim and provided with oil collecting grooves, and means for scraping oil from said grooves in the oil reservoir.

5. In a speed reducing gear, a low speed gear member having its periphery provided with a toothed circumferentially enlarged portion, and also presenting annular bearing surfaces at opposite sides of, and inwardly beyond, said toothed portion, the body of said member being of a sufficient diameter for the direct connection of crank pins thereto between its axis and said bearing surfaces, and a support for said gear member including an annulus substantially entirely therearound and constituting the sole support thereof, completely housing and closely surrounding the toothed portion of the gear member, and also including side rings secured laterally against said annulus and having bearing contact with the said bearing surfaces and the sides of the toothed portion of the gear member entirely therearound.

6. In a speed reducing gear, a low speed gear member having its periphery provided with a toothed, circumferentially enlarged portion, and also presenting annular bearing surfaces at opposite sides of, and inwardly beyond, said toothed portion, the body of said member being of a sufficient diameter for the direct connection of crank pins thereto between its axis and said bearing surfaces, and a support for said gear member annularly therearound and constituting the sole support thereof, including an annulus completely housing, and approximately of the width of, the toothed portion of the gear member, forming with the latter an oil carrying channel for the circulation of oil on the toothed portion, and including side rings secured laterally against the side edges of said annulus having bearing contact with the said bearing surfaces and the sides of the toothed portion of the gear, the said bearing surfaces and the corresponding faces of said side sections having coacting means preventing leakage of oil therebetween.

7. In a gearing of the character set forth, a low speed member in the form of a shaftless ring gear having an externally toothed rim, a support including an annulus disposed closely around the toothed rim of the gear, and a hollow base portion forming an oil reservoir, within the lower portion of which reservoir the annulus has an opening permitting oil to enter the gear teeth, side bearing members secured entirely around and laterally against the annulus and having bearing surfaces in contact with peripheral portions of the ring gear to journal and confine the latter against lateral displacement, and means for preventing leakage of oil along the said bearing surfaces of the bearing members.

EDGAR W. PATTERSON.